Patented Dec. 10, 1929

1,738,930

UNITED STATES PATENT OFFICE

GEORGE FREDERICK SMITH, OF URBANA, ILLINOIS

MAGNESIUM PERCHLORATE

No Drawing. Application filed June 13, 1927. Serial No. 198,701.

This invention relates to magnesium perchlorate and is herein disclosed as applied to a special anhydrous form together with a process for producing it.

According to the present invention the magnesium perchlorate may be cheaply prepared in granular form by grinding together suitable amounts of ammonium perchlorate and magnesium oxide or magnesium carbonate, followed by heating.

Suitable quantities, as two molecular equivalents of anhydrous ammonium perchlorate and one molecular equivalent of light precipitated magnesium oxide or carbonate were ground together in a ball mill to a fineness estimated at about 200-mesh. The product resulting from the grinding was obtained in a satisfactory form for use as a dehydrator or water absorbent after it had been heated, either at ordinary pressures or at a vacuum approximating a quarter of an inch. The dried product was obtained in three to five hours by heating at this reduced pressure when the temperature was 250° C. Temperatures up to 350° C. have been found useful, that is up to the temperature of decomposition of the perchlorate.

During the heating, ammonia and water come off, and also carbon dioxide if it is present,—the reaction beginning at atmospheric pressures and temperatures, as is shown by the odor of ammonia evolved on mixing the materials, but acceleration by heat and reduced pressure is usually desirable until the reaction is complete. If an excess amount of ammonium perchlorate is employed the excess can be eliminated, if desired, by continued heat under reduced pressure.

When it is desired to avoid basicity in the finished product an excess of the ammonium perchlorate may be employed. If a product is desired which will not absorb carbon dioxide an excess of magnesium carbonate may be employed.

The resulting anhydrous magnesium perchlorate absorbs both gaseous ammonia and water. In absorbing water it shows an eagerness and thoroughness equal to phosphorous pentoxide and it absorbs three or more times as much as the latter. It retains its granular form even when reheated to recover the anhydrous form from the trihydrate.

The water forms first the trihydrate with the magnesium perchlorate, and this is stable at temperatures up to 180° C., though it gives up its water at easily obtainable higher temperatures.

The material, therefore, provides an easily operable method of obtaining anhydrous ammonia from hydrous ammonia. It is only necessary to pass at a suitable pressure water-bearing ammonia gas over or through the magnesium perchlorate, cutting off the vapor before the amount of water exceeds that which can be taken up in forming the trihydrate of magnesium perchlorate. Anhydrous ammonia is then given off, first at ordinary temperatures and pressures, and later, more completely at higher temperatures up to 180° C. After the ammonia gas has all come off, the water may be driven off by heating the residue, the trihydrate, at temperatures above 180° C. and preferably below 350° C. thus regaining the anhydrous magnesium perchlorate. These and drying procedures are greatly facilitated by the light porous form of the magnesium perchlorate when made from light magnesium oxide or carbonate.

Having thus described certain embodiments of my invention, what I claim is:

1. Light granular magnesium perchlorate.
2. Granular magnesium perchlorate.
3. Granular magnesium perchlorate having no affinity for carbon dioxide.
4. Anhydrous light magnesium perchlorate.
5. Anhydrous light granular magnesium perchlorate.
6. Anhydrous granular magnesium perchlorate having no affinity for carbon dioxide.
7. The process of preparing magnesium perchlorate which consists in grinding together ammonium perchlorate and a magnesium compound which will react with it to form the magnesium perchlorate.
8. The process of preparing magnesium perchlorate which consists in grinding together anhydrous ammonium perchlorate and a magnesium compound which will react with it to form the magnesium perchlorate.

9. The process of preparing anhydrous magnesium perchlorate which consists in grinding together anhydrous ammonium perchlorate and an anhydrous magnesium compound which will react with it to form the magnesium perchlorate, and drying the resulting product.

10. The process of preparing anhydrous magnesium perchlorate without affinity for carbon dioxide which consists in grinding together magnesium carbonate and ammonium perchlorate so that the magnesium carbonate is in excess, and heating the resulting product at a temperature which will drive off water but not create a material affinity for carbon dioxide.

11. The process of preparing anhydrous magnesium perchlorate without affinity for carbon dioxide which consists in grinding together anhydrous ammonium perchlorate together with a magnesium compound which will react with it to form the magnesium perchlorate, there being present some excess of anhydrous magnesium carbonate, and heating the resulting product at a temperature which will drive off water but not create a material affinity for carbon dioxide.

12. The process of preparing magnesium perchlorate suitable for water absorbing purposes which consists in grinding together ammonium perchlorate and light magnesium-bearing material which will react with it to form the magnesium perchlorate, and heating the material above 180° C. to drive off the water from the material.

GEORGE FREDERICK SMITH.